(12) United States Patent
Palaschenko

(10) Patent No.: US 6,634,441 B2
(45) Date of Patent: Oct. 21, 2003

(54) SYSTEM AND METHOD FOR DETECTING ROLLER BIT BEARING WEAR THROUGH CESSATION OF ROLLER ELEMENT ROTATION

(75) Inventor: Yuri A. Palaschenko, Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/933,865

(22) Filed: Aug. 21, 2001

(65) Prior Publication Data

US 2002/0088647 A1 Jul. 11, 2002

Related U.S. Application Data

(60) Provisional application No. 60/226,764, filed on Aug. 21, 2000.

(51) Int. Cl.$^7$ ................................................ E21B 12/02
(52) U.S. Cl. ........................................................ 175/39
(58) Field of Search ............................ 175/39, 339, 371, 175/331, 327

(56) References Cited

U.S. PATENT DOCUMENTS

| | | | |
|---|---|---|---|
| 2,560,328 A | | 7/1951 | Bielstein |
| 2,582,312 A | | 1/1952 | Del'Homme |
| 3,011,566 A | * | 12/1961 | Graham ........................ 175/39 |
| 3,058,532 A | | 10/1962 | Alder |
| 3,062,302 A | | 11/1962 | Toth et al. |
| 3,363,702 A | | 1/1968 | Bielstein |
| 3,578,092 A | | 5/1971 | Tesch et al. |
| 3,581,564 A | | 6/1971 | Young, Jr. |
| 3,678,883 A | * | 7/1972 | Fischer ........................ 116/208 |
| 3,703,096 A | | 11/1972 | Vitter, Jr. et al. |
| 3,714,822 A | | 2/1973 | Lutz |
| 3,728,919 A | | 4/1973 | Scott |
| 3,774,445 A | | 11/1973 | Rundell et al. |
| 3,782,190 A | | 1/1974 | Pittman |
| 3,818,227 A | | 6/1974 | Fries |
| 3,853,087 A | | 12/1974 | Aldag |
| 3,853,184 A | * | 12/1974 | McCullough ................ 175/39 |
| 3,865,736 A | | 2/1975 | Fries |
| 3,906,434 A | | 9/1975 | Lamel et al. |
| 3,913,686 A | | 10/1975 | Manson, Jr. |
| 4,001,773 A | | 1/1977 | Lamel et al. |
| 4,030,558 A | | 6/1977 | Morris |
| 4,040,003 A | | 8/1977 | Beynet et al. |
| 4,063,786 A | | 12/1977 | Rall |
| 4,074,575 A | | 2/1978 | Bergman et al. |
| 4,114,704 A | | 9/1978 | Maurer et al. |
| 4,148,271 A | | 4/1979 | Majernik |
| 4,150,568 A | | 4/1979 | Berger et al. |
| 4,346,591 A | | 8/1982 | Evans |

(List continued on next page.)

FOREIGN PATENT DOCUMENTS

| GB | 2 363 146 A | 12/2001 |
|---|---|---|
| GB | 2 365 899 A | 2/2002 |

Primary Examiner—David Bagnell
Assistant Examiner—Daniel P Stephenson
(74) Attorney, Agent, or Firm—Robert Groover; Groover & Associates

(57) ABSTRACT

A system and method for detecting the wear of a roller bit bearing on a roller drill bit body where the roller element has a plurality of cutting elements and is rotatably attached to the roller drill bit body at the bearing. In the invention, a rotation impeder is in between the roller element and roller drill bit body and upon uneven rotation of the roller element which indicates that the roller element bearing may fail, the rotation impeder impedes the rotation of the roller element. The drill rig operator at the surface can cease drilling operations upon detection of the cessation of rotation of the roller element. The rotation impeder can also be seated in a drilling fluid outlet and cause a detectable loss in drilling fluid pressure when dislodged to otherwise cease rotation of the roller drill bit.

18 Claims, 7 Drawing Sheets

U.S. PATENT DOCUMENTS

| | | |
|---|---|---|
| 4,379,291 A | 4/1983 | Hubbard et al. |
| 4,425,010 A | 1/1984 | Bryant et al. |
| 4,436,164 A | 3/1984 | Garner |
| 4,441,244 A | 4/1984 | Cason, Jr. |
| 4,493,042 A | 1/1985 | Shima et al. |
| 4,548,280 A | 10/1985 | Daly et al. |
| 4,562,559 A | 12/1985 | Sharp et al. |
| 4,610,313 A | 9/1986 | Daly et al. |
| 4,627,276 A | 12/1986 | Burgess et al. |
| 4,655,300 A * | 4/1987 | Davis, Jr. et al. ............. 175/39 |
| 4,659,043 A | 4/1987 | Gallagher |
| 4,665,393 A | 5/1987 | Wilder et al. |
| 4,685,329 A | 8/1987 | Burgess |
| 4,688,647 A | 8/1987 | Daly et al. |
| 4,730,681 A * | 3/1988 | Estes ............................ 175/39 |
| 4,773,263 A | 9/1988 | Lesage et al. |
| 4,785,894 A * | 11/1988 | Davis, Jr. et al. ............. 175/39 |
| 4,785,895 A * | 11/1988 | Davis, Jr. et al. ............. 175/39 |
| 4,790,190 A | 12/1988 | Bambara et al. |
| 4,812,826 A | 3/1989 | Kaufman et al. |
| 4,818,153 A | 4/1989 | Strandell et al. |
| 4,852,399 A | 8/1989 | Falconer |
| 4,876,886 A | 10/1989 | Bible et al. |
| 4,903,245 A | 2/1990 | Close et al. |
| 4,911,252 A * | 3/1990 | Estes ............................ 175/39 |
| 4,926,686 A | 5/1990 | Fay |
| 4,926,950 A | 5/1990 | Zijsling |
| 4,928,521 A | 5/1990 | Jardine |
| 4,958,125 A | 9/1990 | Jardine et al. |
| 5,001,993 A | 3/1991 | Gramlow |
| 5,072,611 A | 12/1991 | Budd et al. |
| 5,138,875 A | 8/1992 | Booer |
| 5,140,311 A | 8/1992 | Cook |
| 5,141,061 A | 8/1992 | Henneuse |
| 5,159,577 A | 10/1992 | Twist |
| 5,183,123 A | 2/1993 | White |
| 5,216,917 A | 6/1993 | Detournay |
| 5,226,332 A | 7/1993 | Wassell |
| 5,249,871 A | 10/1993 | LaTorre et al. |
| 5,305,836 A | 4/1994 | Holbrook et al. |
| 5,321,981 A | 6/1994 | Macpherson |
| 5,372,207 A | 12/1994 | Naville et al. |
| 5,415,030 A | 5/1995 | Jogi et al. |
| 5,602,437 A | 2/1997 | Shahamat et al. |
| 5,633,628 A | 5/1997 | Denny et al. |
| 5,677,488 A | 10/1997 | Monahan et al. |
| 5,691,707 A | 11/1997 | Smith et al. |
| 5,794,720 A | 8/1998 | Smith et al. |
| 5,864,058 A | 1/1999 | Chen |
| 5,865,543 A | 2/1999 | MacLean |
| 2001/0054514 A1 * | 12/2001 | Sullivan et al. ............... 175/40 |

* cited by examiner

SYSTEM AND METHOD FOR DETECTING ROLLER BIT BEARING WEAR THROUGH CESSATION OF ROLLER ELEMENT ROTATION

CROSS-REFERENCE TO RELATED APPLICATION

This application claims the benefit of U.S. Provisional Application Ser. No. 60/226,764, filed Aug. 21, 2000.

BACKGROUND OF THE INVENTION

1. Field of the Invention

The present invention generally relates to subterranean drilling equipment. More particularly, the present invention relates to a system and method for detecting roller bit wear in a roller-cutter drill through preventing the rotation of the roller bit having a worn roller bit bearing, and detecting the presence of the non-rotating roller bit is detectable such that the drilling operation can be stopped prior to roller drill bit failure.

2. Description of the Related Art

In rotary-cutter type subterranean drills, rotary drill bits are a commonly used type of drill bit, especially in the oil and gas well drilling industry, because the rotary drill bit offers a satisfactory rate of penetration with a significant operational life in drilling most commonly encountered formations. Roller-cutter drill bits include a bit body having a threaded pin at its upper end adapted to be detachably secured to a drill string suspended from a drill rig, and a plurality of depending legs, typically three such legs, at the lower end of the body. The drill bit further includes a plurality of conical or spherical roller-cutters having cutting elements thereon, with one roller-cutter on each leg, and each leg typically includes a bearing for rotatably mounting each roller-cutter thereon.

Sealed bearing type roller-cutter bits further have a lubrication system including a reservoir holding a supply of lubricant. A passage in the bit body extends from the reservoir to the bearing to allow flow of lubricant to the bearing. A seal is disposed between the roller cutter and the bearing journal that holds lubricant in the bit. A diaphragm at the reservoir provides pressure compensation between the lubricant and the drilling fluid in the annulus between the bit and the well bore.

In use, roller cutter drill bits are rotated in the well bore on the end of a drill string that applies a relatively high downward force onto the drill bit. As the bits are rotated, the conical roller cutters rotate on the bearing journals thereby bringing the cutting elements on the roller cutters into engagement with the substrate at the bottom of the well bore. The cutting elements drill through the substrate at the well bore bottom by applying high point loads to the substrate to thereby cause the substrate to crack or fracture from the compression. A drilling fluid, commonly called drilling mud, passes under pressure from the surface through the drill string to the drill bit, and is ejected from one or more nozzles adjacent the roller-cutters and the drilling fluid is then forced back up the well bore to the surface.

For cost-effective drilling, a worn drill bit needs to be replaced due to the reduced rate of drilling penetration for the worn bit. At a certain point, the cost of replacing the old drilling bit with a new bit becomes equal to the cost of the drilling inefficiency, or in other words, the cost of the new bit plus the cost of rig time in moving the drill string in and out of the well bore is less then cost of operating the worn bit. Unfortunately, once a drill bit is positioned in a well bore, gathering reliable information regarding the operating condition, performance and remaining useful life of the drill bit becomes difficult. Typically, the decision by a drilling rig operator to replace a drill bit is a subjective one, based upon experience and general empirical data showing the performance of similar drill bits in drilling similar substrate formations. However, the rig operator's decision as to when to replace a drill bit is often not the most cost effective because of the many factors affecting drilling performance beyond the condition and performance of the bit itself.

In the worst case, the drilling rig operator may unknowingly run the drill bit until failure. Bit failure may also result from an improper application of the bit, such as by excessive weight on the drill bit from the drilling string, excessive rotational speed, and drilling with the wrong type of bit for the substrate being drilled, or even from a defect in the drill bit itself. Bit failures typically occur in one of two modes: (1) breakage of the cutting elements, or (2) bearing failure. The first mode of failure is more common, and the second mode is more serious.

In the first mode, pieces of the cutting elements, which are typically either steel teeth or tungsten carbide inserts, are broken from the roller cutters. This breakage does not normally stop the drilling action but it does significantly reduce the rate of drilling penetration, and the broken pieces are mostly carried away from the well bore bottom by the circulating drilling fluid thereby leaving the well bore bottom clean for a replacement bit.

The second mode of failure can occur if the bit is continued to be used with a worn bearing assembly as the assembly will no longer be able to hold the roller cutter on the bearing journal, and consequently, the roller cutter will fall from the bit when the drill string is pulled from the well bore. A lost roller cutter can be retrieved from the well bore bottom only by a time-consuming and expensive "fishing" operation in which a special retrieval tool is tripped in and out of the well bore to retrieve the broken cutter and any pieces.

In sealed bearing roller cutter bits, bearing failure is often the result of a seal failure that causes lubricant to flow out of the drill bit and drilling fluid, which contains abrasive particles, to flow into the bearing. Although less common, diaphragm failure has the same result as seal failure. In any event, bearing failure is almost always preceded by, or at least accompanied by, a loss of lubricant and uneven rotation or vibration of the roller bit.

Numerous bearing failure indicator systems have been proposed for inclusion in drill bits so as to give the drilling rig operator a signal predicting bearing failure. One such system involves measurement and interpretation of certain drilling parameters at the drill rig, such as drill string torque, weight on bit, and rate of penetration, to predict drill bit bearing failure. In practice this system has proved to be unreliable, likely due to the large number of variables other than bit performance, such as the type of substrate formation and the pressure and flow rate of the drilling fluid, which affect the drilling parameters that are measured at the drill rig.

Another system, involves a marker fluid, such as a radioactive material in the bearing lubricant, which is released into the drilling fluid upon bearing failure. The released marker fluid is detected at the drill rig when the drilling fluid is circulated back up to the surface. While this method does detect the loss of lubricant in a sealed bearing drill bit that precedes, or at least accompanies, the failure of the bearings of the roller bit, and thus is a reliable indication of bit failure, the system has several shortcomings. In addition to the difficulties present in handling radioactive materials, a major shortcoming is that a significant amount of marker fluid must be released into the relatively large volume of drilling fluid or else become so diluted as to be undetectable.

Therefore, it would be advantageous to provide a system and method to reliably detect the wear of a roller bit prior to catastrophic failure of the roller bit such that the roller bit, the roller cutters, or pieces thereof require extrication from the well bore. Such method should be simple in implementation and not require separate elaborate equipment to be used at the drill rig or on the drill bit. Further, such system and method should be easily redeployed once the roller bit or bits have been changed. It is thus to the provision of such an improved method for detecting roller bit bearing wear that the present invention is primarily directed.

SUMMARY OF THE INVENTION

The present invention is a system and method for detecting the wear of a roller bit bearing holding a roller element on a roller drill bit body. The roller element has a plurality of cutting elements and is rotatably attached to the roller drill bit body at the bearing, and rotation of the roller element causes the cutting elements to drill into the substrate. The invention uses a rotation impeder in between the roller element and roller drill bit body that selectively impedes the rotation of the roller element upon uneven rotation of the roller element. The uneven rotation, or "wobble," of the roller element is typically caused by the bearing beginning to fail and is an excellent indicator of an impending bearing failure. The rotation impeder can be housed in either the roller drill bit body or the roller element.

In one embodiment, the roller drill bit body includes a drilling fluid passage and outlet therein and the rotation impeder is positioned in the fluid outlet to prevent drilling fluid from flowing through the passage and out of the outlet. When the rotation impeder deploys upon uneven rotation of the roller element to impede the rotation of the roller element, the rotation impeder is also removed from the fluid outlet whereby drilling fluid flows from the drilling fluid outlet. In such embodiment, both the cessation of roller element rotation and drop in drilling fluid pressure due to the opening of the drilling fluid outlet can be detected at the surface to indicate an impending roller bearing failure.

The rotation impeder, in one embodiment, is a selectively extendable detent held in the roller drill bit body and is selectively extended from the roller drill bit body and into a recess of the roller element to thereby cease rotation of the roller element. In another embodiment, the roller drill bit body includes a roller drill bit body recess therein that faces the roller element when rotatably attached to the roller bit bearing, and the roller element includes a roller bit element recess therein which interfaces the roller drill bit body recess. In such embodiment, the rotation impeder can be a ball bearing and a spring in the roller drill bit body wherein upon uneven rotation of the roller element, the ball bearing is ejected into the roller element recess and the ball bearing becomes lodged between the roller element recess and the roller drill bit body recess to thereby cease rotation of the roller element. Alternately, the rotation impeder can be a wedge selectively fitted in the roller drill bit body, wherein upon uneven rotation of the roller element, the wedge is ejected into the roller element recess and the wedge becomes lodged between the roller element recess and the roller drill bit body to thereby cease rotation of the roller element.

The present invention further provides a method for detecting the wear of a roller bit bearing of a roller drill bit body having a roller element including a plurality of cutting elements rotatably attached thereto at the bearing, and a rotation impeder that selectively impedes rotation of the roller element is in between the roller element and roller drill bit body. The method includes the steps of rotating the at least one roller element, and upon uneven rotation of the at least one roller element, impeding the rotation of the at least one roller element with the rotation impeder, and detecting the cessation of the rotation of the at least one roller element.

If the roller drill bit body includes a drilling fluid passage and outlet therein with the rotation impeder positioned in the fluid outlet to prevent drilling fluid from flowing through the passage, the method further includes the steps of, upon uneven rotation of the roller element causing the rotation impeder to impede the rotation of the roller element, removing the rotation impeder from the fluid outlet whereby drilling fluid flows from the drilling fluid passage, and detecting the drop in drilling fluid pressure that occurs from the open fluid outlet.

It the roller element includes a recess that is placed in between the roller element and roller drill bit body with a detent held in the roller drill bit body, the step of impeding the rotation of the at least one roller element with the rotation impeder is selectively extending the rotation impeder from the roller drill bit body into the recess to thereby cease rotation of the roller element. If the roller drill bit body includes a roller drill bit body recess therein facing the roller element and the roller element includes a roller element recess therein which interfaces the roller drill bit body recess, and the rotation impeder is comprised of a ball bearing and a spring in the roller drill bit body, the step of impeding the rotation of the at least one roller element with the rotation impeder is impeding the rotation of the at least one roller element through ejecting the ball bearing into the roller element recess and the ball bearing becoming lodged between the roller element recess and the roller drill bit body recess to thereby cease rotation of the roller element. Alternately, when the roller drill bit body and roller element include a roller drill bit body recess and a roller element recess respectively, and the rotation impeder is a wedge selectively fitted in the roller drill bit body, the step of impeding the rotation of the at least one roller element with the rotation impeder is impeding the rotation of the at least one roller element through ejecting the wedge into the roller element recess and the wedge becoming lodged between the roller element recess and the roller drill bit body to thereby cease rotation of the roller element.

The present invention therefore provides a simple and inexpensive system and method to detect roller bit wear during the drilling operation using cessation of the rotation of one or more roller elements as an indication of the condition of the roller bit bearing. The invention can also use a second method of detecting possible bearing failure by also opening an additional outlet of drilling fluid to cause a greater volume than normal of drilling fluid to flow during operation of the roller drill bit, and the resultant drop in the drilling fluid pressure can be detected. Both the frequency of roller bit rotation and drilling fluid pressure can be monitored in extant drilling equipment, and thus the present invention can be implemented in an existing drill rig without the need for installation of additional specific monitoring equipment.

Further, the present invention does not require significant effort to redeploy the detection system because the rotation impeder can easily be reset or replaced once a new roller element or component, such as a bearing, is replaced on the roller-cutter drill bit. If embodied with the rotation impeder held in the drilling fluid outlet, the rotation impeder is also easily replaced into a drilling fluid outlet once the new roller element or components are replaced on the roller-cutter drill bit.

Other objects, features, and advantages of the present invention will become apparent after review of the hereinafter set forth Brief Description of the Drawings, Detailed Description of the Invention, and the claims.

DETAILED DESCRIPTION OF THE INVENTION

Figure 1:
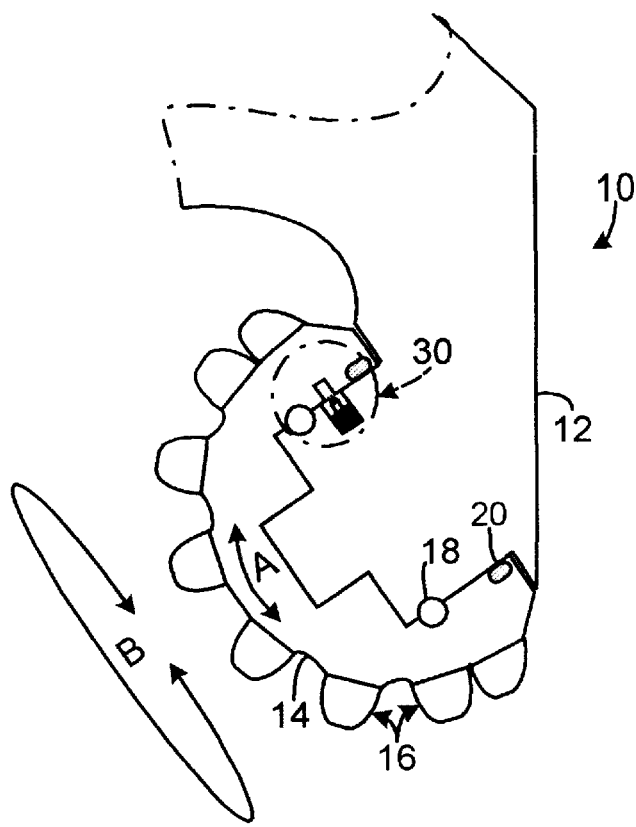
FIG. 1 is a cross-section of a roller element with a first embodiment of the rotation impeder being a detent that selectively extends from the roller drill bit body into the roller element upon uneven rotation of the roller element.

With reference to the figures in which like numerals represent like elements throughout, FIG. 1 is a cross-section of the present inventive system 10 to detect roller element 14 wear, with a roller drill a roller drill bit body 12 with a roller element 14 attached thereto at a roller bit bearing 18. Most roller-cutter drills have 2 or 3 roller elements on the drill, however, for ease of illustration, one roller element 14 is shown here. The roller element 14 includes a plurality of cutting elements 16 and is rotatably attached, shown by rotation arrow B, to the roller drill bit body 12 at the bearing 18, and a lubrication passage 20 provides adequate lubrication for rotation of the roller element 14 as is known in the art. The system 10 has a rotation impeder 30 in between the roller element 14 and roller drill bit body 12 that selectively impedes the rotation (arrow B) of the roller element 14 upon uneven rotation of the roller element 14, as shown by arrow A, indicating that the roller bit bearing 18 may fail. The rotation impeder 30 is housed in the roller drill bit body 12 or in the roller element 14.

Figure 2A:
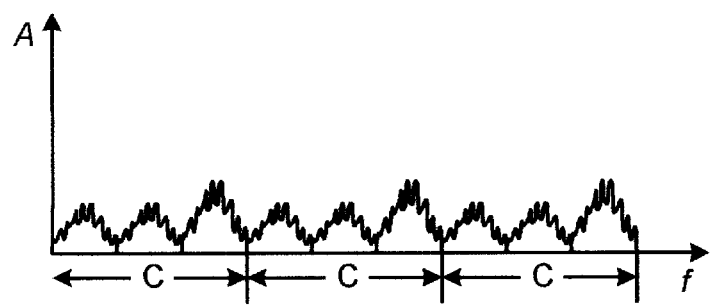
FIG. 2A is an amplitude-frequency graph illustrating the normal rotation of the roller elements during drilling.
Figure 2B:
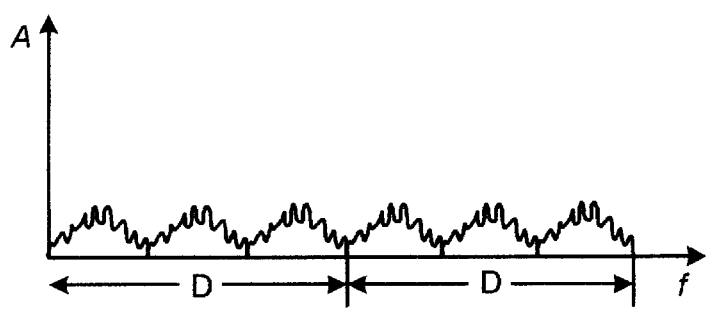
FIG. 2B is an amplitude-frequency graph illustrating the periodic variance in rotation with one roller element not rotating.

The cessation of rotation of the roller element 14 by the rotation impeder 30 is readily detectable by sensing the frequency of operation of the roller-cutter drill, as is shown in FIGS. 2A and 2B. FIG. 2A is an amplitude-frequency graph illustrating the normal operation of a three roller element drill. The period of the rotation of the three operational roller elements is shown as period C with three amplitude spikes per period, and this frequency can be sensed on the surface through the drill string. If one of the roller elements locks up, such as roller element 14, then there are only two amplitude spikes per period, as shown by period D in FIG. 2B, which indicates that only two of the roller elements are rotating. Thus, when the drill rig operator sees a change in frequency as shown from the graph of FIG. 2A to the graph of FIG. 2B, the drill operator becomes aware that one of the roller elements has locked up and can cease drilling to trip the drill string from the well bore and replace the worn bearing, or otherwise fix any problems on roller cutter bit.

Figure 3A:
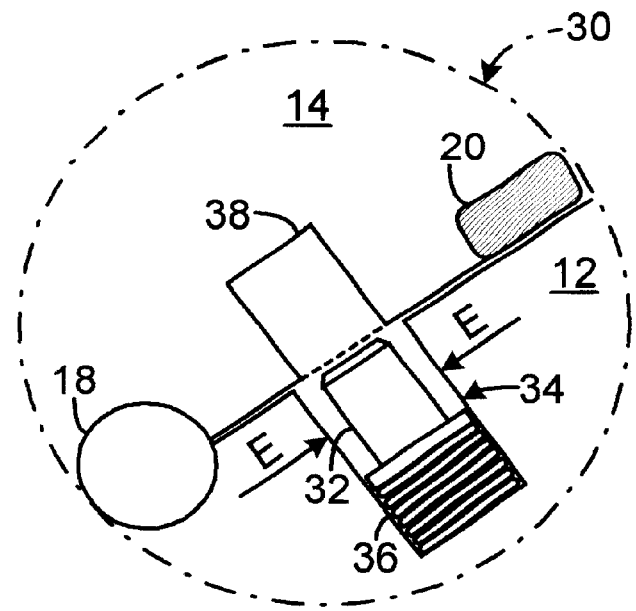
FIG. 3A is a cross-section of the detent rotation impeder of FIG. 1, with the detent held in the roller drill bit body and the roller element rotating freely.
Figure 3B:
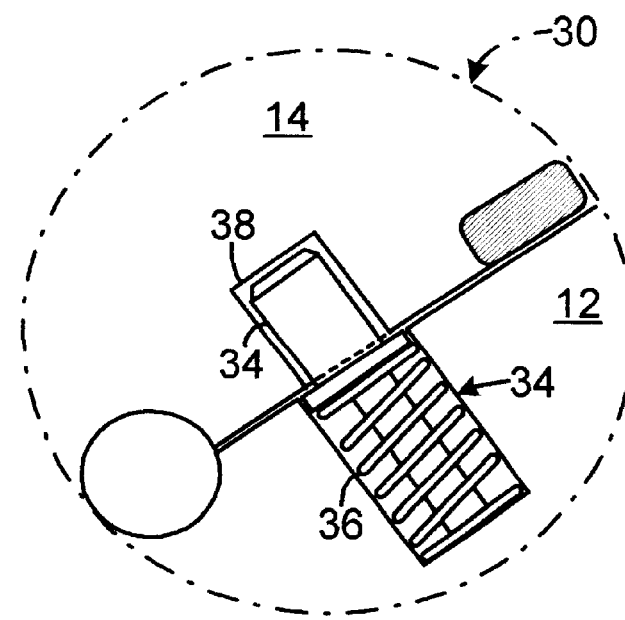
FIG. 3B is a cross-section of the detent rotation impeder of FIG. 3A wherein the detent has dislodged from the roller drill bit body into the roller element to cease rotation of the roller element.

In FIGS. 3A and 3B, there is shown the embodiment of the rotation impeder 30 of FIG. 1 wherein the rotation impeder 30 is a detent 32 held within a recess 34 on the roller drill bit body 12, and rests upon a spring 36, or other motive member. Upon uneven rotation of the roller element 14, as shown by motion in the directions of arrows E, the detent 32 selectively extends into a recess 38 of the roller element 14 to stop rotation of the roller element 14. The recess 38 can be a hole facing the roller drill bit body 12 that periodically rotates over the drill bit body recess 34 and the detent 32 rests against the rotating roller element 14, and then slides into the roller element recess 38 to stop the rotation of the roller element 14 as is shown in FIG. 3B.

Figure 4:
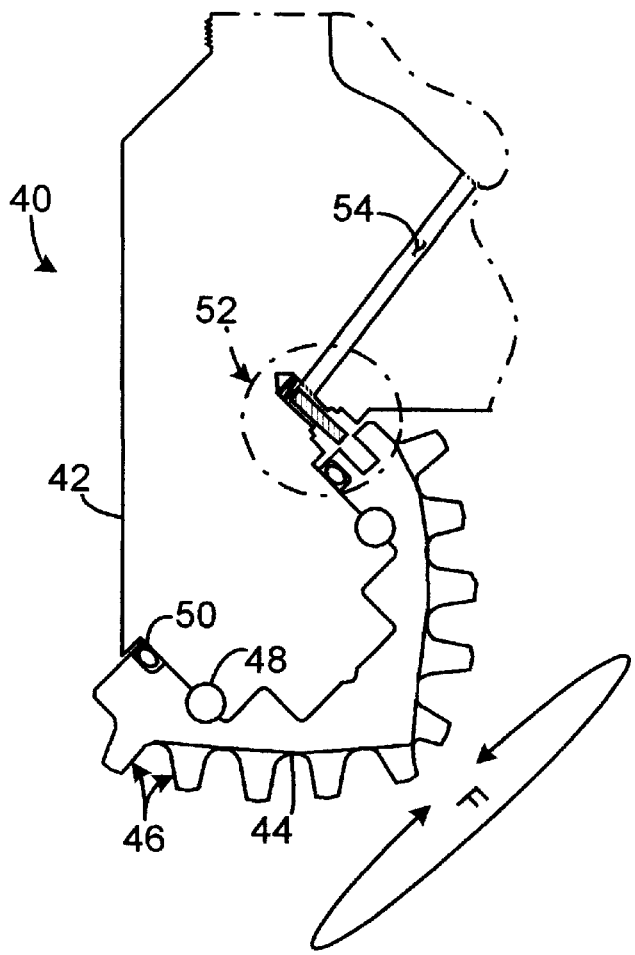
FIG. 4 is a top view of a channel in the roller drill bit with several recesses therein that receive various embodiments of the rotation impeder when dislodged and preventing rotation of the roller element.

FIG. 4 is a top view of a channel 40 in the roller drill bit 14 with several recesses therein that receive various embodiments of the rotation impeder 30 as are disclosed herein. The rotation impeder dislodges from its housing and into a shaped recess such as circular recess 42 which receives detent 32 of rotation impeder 30, or oval-shaped recess 44 which receives the L-shaped rotation impeder 80 of FIGS. 7–8B. The rotation impeder 30 can ride in the channel 40 during normal rotation of the roller element 14, or otherwise can be completely recessed into its housing until deployment at uneven rotation of the roller element 14. If the rotation impeder 30 is housed in the roller element 14, then the channel 40 and/or recesses 42, 44 are on the roller drill bit body 12.

Figure 5:
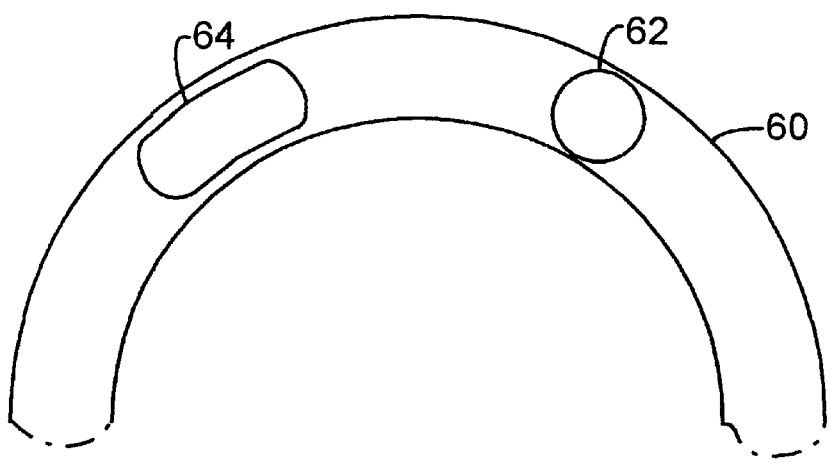
FIG. 5 is a cross-section of an alternate embodiment of the rotation impeder wherein the rotation impeder is held in an outlet of a drilling fluid passage on the roller drill bit body.
Figure 6A:
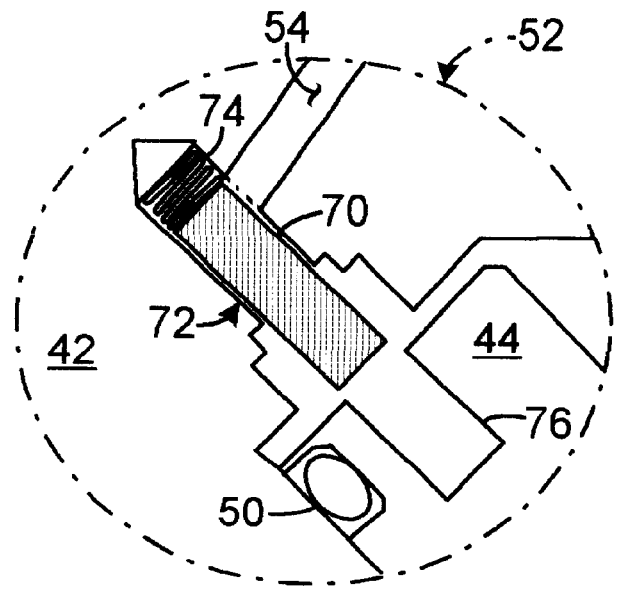
FIG. 6A is a cross-section of the rotation impeder of FIG. 4, wherein the rotation impeder is held within the drilling fluid outlet and the roller element rotates freely.
Figure 6B:
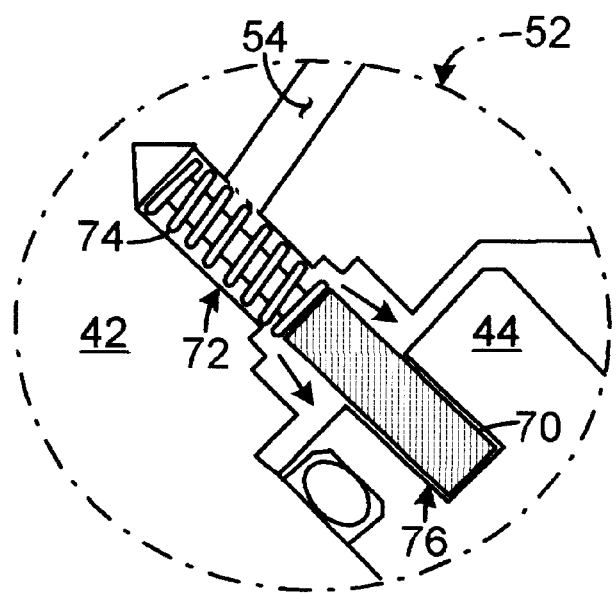
FIG. 6B is a cross-section of the rotation impeder of FIG. 6A, wherein the rotation impeder has dislodged from the drilling fluid outlet and into the channel of the roller element to cease rotation of the roller element, and drilling fluid now flows from the drilling fluid outlet.

In another embodiment of the inventive system 50 with rotation impeder 62 shown in FIGS. 5, 6A, and 6B, the roller drill bit body 52 can include a drilling fluid passage 64 therein. The roller drill body 52 has a roller element 54 attached thereto at a roller bit bearing 58. The roller element 54 includes a plurality of cutting elements 56 and is rotatably attached, shown by rotation arrow F, to the roller drill bit body 52 at the bearing 58, and a lubrication passage 60 provides adequate lubrication for rotation of the roller element 54 as is known in the art. The system 50 has a plug 70 in between the roller element 54 and roller drill bit body 52 that selectively impedes the rotation (arrow F) of the roller element 54 upon uneven rotation of the roller element 54 indicating that the roller bit bearing 58 may fail, and the plug 70 is positioned in a fluid outlet 72 of the drilling fluid passage 64 and prevents drilling fluid from flowing from the fluid passage 64 while seated or lodged in the fluid outlet 72. The plug 70 also has a spring 74 within the fluid outlet 72 to assist in dislodging the plug 70, but the use of the spring 74 or other motive member is not necessary. The plug 70 can be made from any rigid, semi-rigid, or elastomeric material depending upon the particular design of the system 10.

When uneven rotation of the roller element 54 occurs, the plug 70 is dislodged or unseated from the fluid outlet 72, as shown in FIG. 6B, and slides into roller element recess 76 to impede the rotation of the roller element 54. The dislodging or unseating of the plug 70 also allows fluid to flow from the fluid outlet 72 and from the fluid passage 64. The flowing of the drilling fluid from the passage 64 and outlet 72 causes and overall drop in drilling fluid pressure that is detectable at the surface by the drilling rig operator, in addition to the change of operation frequency, as shown in FIGS. 2A and 2B.

Figure 7:
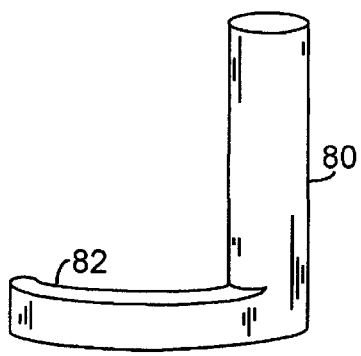
FIG. 7 is an alternate embodiment of the rotation impeder having a L-shape.
Figure 8A:
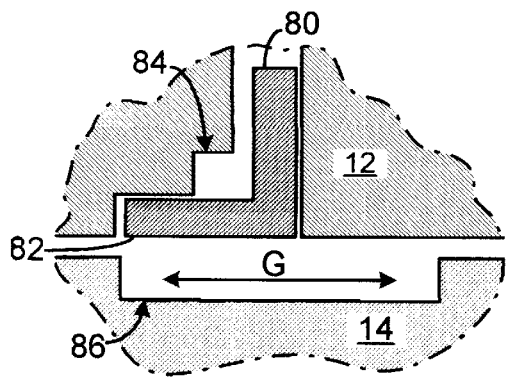
FIG. 8A is an alternate embodiment of the system utilizing the rotation impeder of FIG. 7, with the rotation impeder held within the drilling fluid outlet of the roller drill bit body.
Figure 8B:
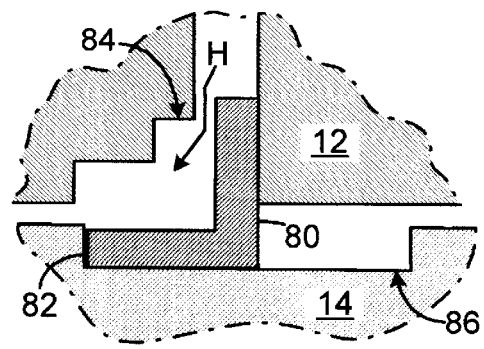
FIG. 8B is the embodiment of the system in FIG. 8A, with the rotation impeder dislodged from the drilling fluid outlet and lodged in the channel of the roller element to thereby cease rotation of the roller element and allow drilling fluid to flow through the drilling fluid outlet.

FIGS. 7–8B illustrate an alternate embodiment of the rotation impeder with a plug 80 having a L-shape with a lower curved leg portion 82. As shown in FIG. 8A, the plug 80 sits in a fluid outlet 84 in the roller drill bit body 12, opposite a recess 86 in the roller element. The recess 86 can be shaped appropriately to receive the lower leg portion 82 of the plug 80, such as the shape of recess 44 in FIG. 4. The recess 86 is ordinarily in motion, as shown by arrow G, with the roller element 14 rotating until the plug 80 dislodges or unseats from the fluid outlet 84. When uneven rotation of the roller element 14 caused the plug 80 to dislodge from the fluid outlet 84 as shown in FIG. 8B, the leg portion 82 becomes lodged in the channel 86 of the roller element 14 to thereby cease rotation of the roller element 14. The removal of the plug 80 from the outlet 84 also allow drilling fluid to flow through the drilling fluid outlet 84, as shown by arrow H, which causes a detectable drop of drilling fluid pressure in addition to ceasing rotation of the roller element 14.

Figure 9A:
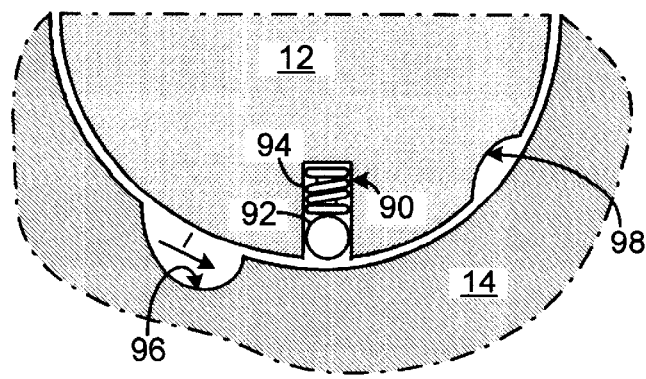
FIG. 9A is a cross-section of another embodiment of the system wherein the rotation impeder is a ball bearing held in the roller drill bit body, and the ball bearing selectively fits within a roller element recess and a roller bit body recess to cease rotation of the roller element.
Figure 9B:
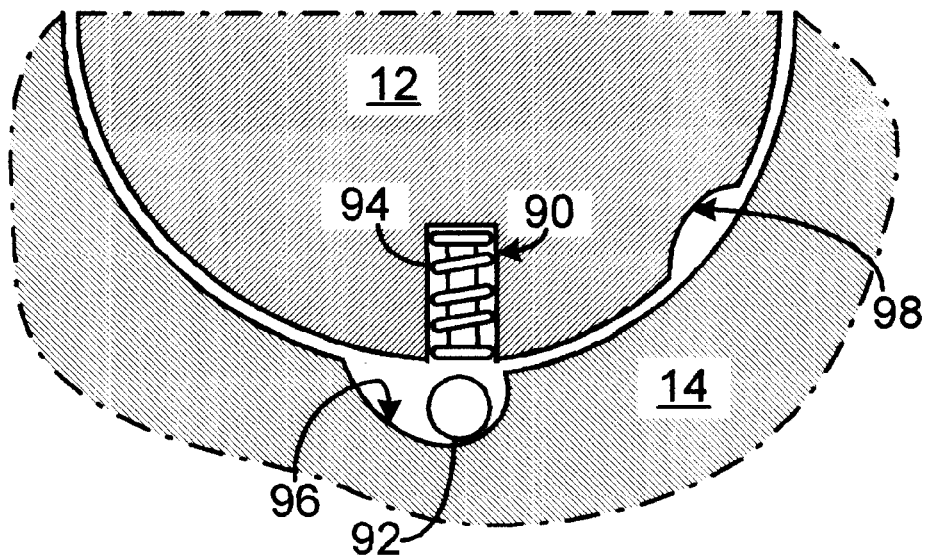
FIG. 9B is cross-section of the system of FIG. 9B, wherein the ball bearing has dislodged from the roller drill bit body and into the roller element recess.
Figure 9C:
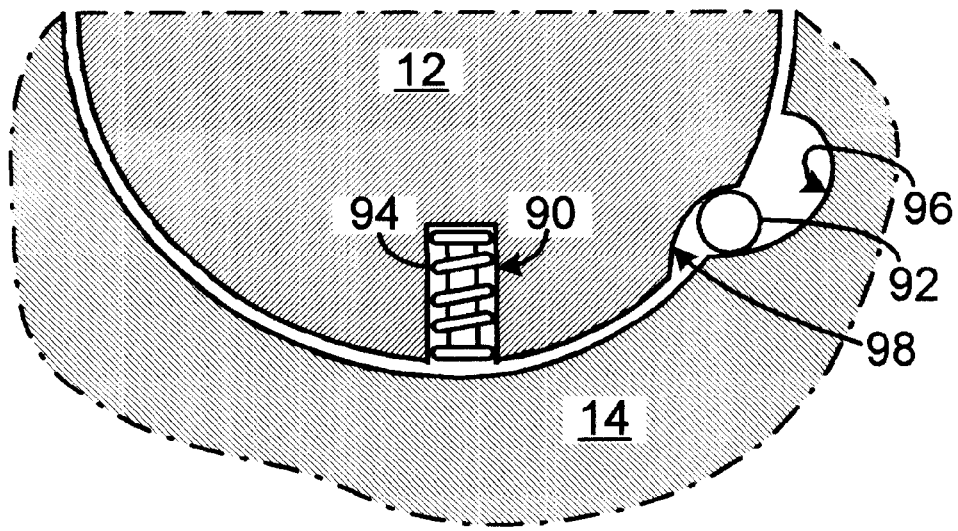
FIG. 9C is a cross-section of the system in FIGS. 9A and 9B, wherein the ball bearing has become lodged between the roller element recess and the body recess to cease rotation of the roller element.

Another embodiment of the rotation impeder is shown in FIGS. 9A–9C. In this embodiment, the drill bit body 12 includes a housing 90 that contains a rotation impeder comprised of a ball bearing 92 and a spring 90. The roller element 14 includes a roller element recess 96 that can receive the ball bearing 92 when dislodged from the housing 90. The roller element recess 96 rotates about the roller drill bit body 12 as shown by arrow I in FIG. 9A. The roller drill bit body 12 also includes a roller drill bit body recess 98 therein that faces the roller element 14 and eventually has the ball bearing 92 lodged therein to cease rotation of the roller element 14. As shown in FIG. 9B, upon uneven rotation of the roller element 14, the ball bearing 92 is ejected from the housing 90 with the assistance of the spring 94 into the roller element recess 96 and is held in the roller element recess 96 as the roller element 14 continues to spin until the roller element recess 96 aligns with the roller drill bit body recess 98. As shown in FIG. 9C, once the roller element recess 96 aligns with the roller drill bit body recess 98, the ball bearing 92 ultimately becomes lodged therebetween to cease rotation of the roller element 14 in the direction of arrow I (FIG. 9A).

Figure 10A:
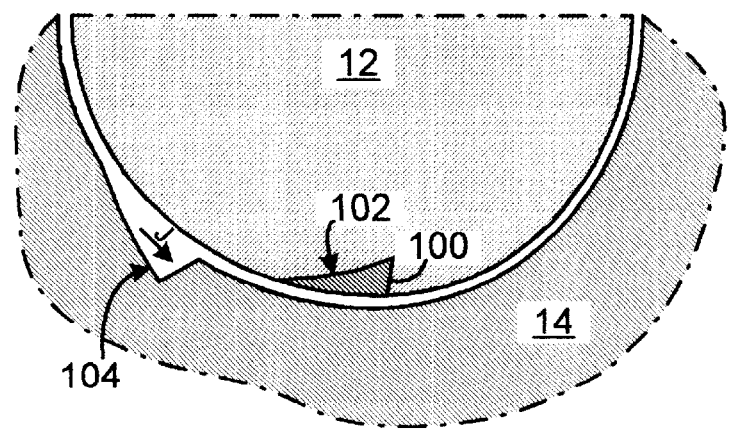
FIG. 10A is a cross-section of a further embodiment of the system having a wedge fitted into a recess of the roller drill bit body and the wedge selectively fits within a roller element recess and a body recess to cease rotation of the roller element.
Figure 10B:
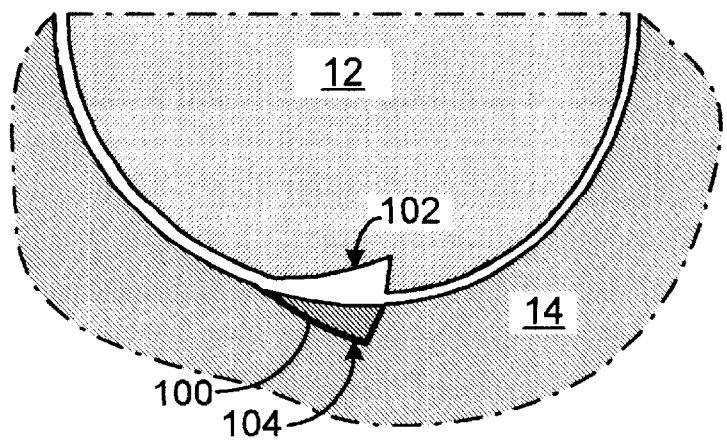
FIG. 10B is a cross-section of the system of FIG. 10A, wherein the wedge has dislodged from the roller drill bit body recess and into the roller element recess.
Figure 10C:
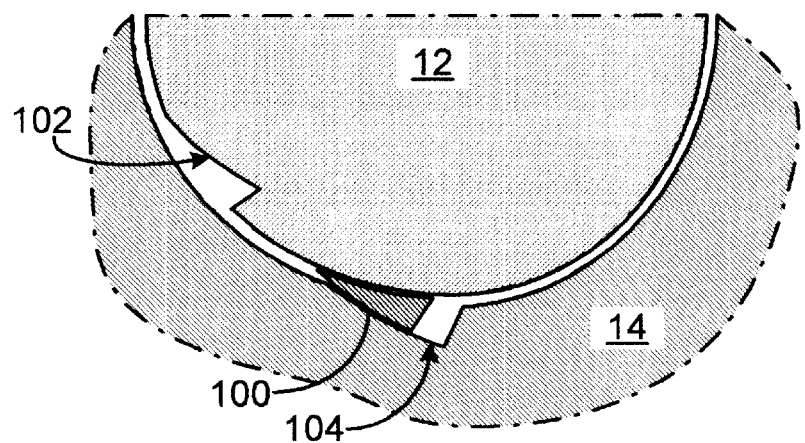
FIG. 10C is a cross-section of the system of FIGS. 10A and 10B, wherein the wedge has slid from the roller element recess to become lodged between the roller drill bit body and the roller element.

In a further embodiment of the invention shown in FIGS. 10A–10C, the roller drill bit body 12 includes a roller drill bit body recess 102 that faces the roller element 14, and the roller element 14 includes a roller element recess 104 which interfaces the roller drill bit body recess 102 at least at one point during the rotation of the roller element 14, the rotation shown by arrow J. The rotation impeder is a wedge 100 selectively fitted in the roller drill bit body recess 102. Upon uneven rotation of the roller element 14, the wedge 100 is ejected into the roller element recess 104, as shown in FIG. 10B, and as the roller element continues to rotate (arrow J in FIG. 10A), the wedge 100 slides from the roller element recess 104 and becomes lodged between the roller element recess 104 and the roller drill bit body 12, as is shown in FIG. 10C, to thereby cease rotation of the roller element 14.

As is further shown in FIGS. 1, and 3A–3B, the inventive system 10 accordingly provides a method for detecting the wear of a roller bit bearing 18 of a roller drill bit body 12 with a roller bit 14 attached thereto, the roller bit 14 including a plurality of cutting elements 16 and rotatably attached to the roller drill bit body 12 at the bearing 18, and a rotation impeder 30 that selectively impedes rotation of the roller bit 14 is in between the roller bit 14 and roller drill bit body 14. The method includes the steps of rotating the at least one roller bit 14 (arrow B), and upon uneven rotation of the at least one roller bit 14, impeding the rotation of the at least one roller bit 14 with the rotation impeder 30, and detecting the cessation of the rotation of the at least one roller bit 14, such as sensing the amplitude-frequency graphs FIGS. 2A–2B.

If the roller drill bit body 42 includes a drilling fluid passage 64 therein, as shown in FIGS. 5–6B, with the rotation impeder 62 is positioned in the fluid outlet 72 to prevent drilling fluid from flowing through the passage 64 and out from the outlet 72, the method further includes the steps of, upon uneven rotation of the roller element 54 causing the rotation impeder 72 to impede the rotation of the roller element 54, removing the rotation impeder (such as plug 70) from the fluid outlet 72 whereby drilling fluid flows from the drilling fluid passage 64 and out of the outlet 72, and detecting the drop of pressure in the drilling fluid pressure.

Further, as shown in the embodiment of FIGS. 3A–3B, if the roller element 14 includes a recess 38 that is placed in between the roller element 14 and roller drill bit body 12, the step of impeding the rotation of the roller element 14 with the rotation impeder 30 is selectively extending the rotation impeder, such as detent 32, from the roller drill bit body 12 into the recess 38 to thereby cease rotation of the roller element 14. Alternately, as shown in FIGS. 9A–9C, if the roller drill bit body 12 includes a roller drill bit body recess 98 therein facing the roller element 14 when rotatably attached to the roller element bearing 18, and the roller element 14 includes a roller element recess 96 therein which interfaces the roller drill bit body recess 98, and the rotation impeder is a ball bearing 92 and a spring 94 in the roller drill bit body 12, the step of impeding the rotation of the roller element 14 with the rotation impeder is impeding the rotation of the roller element 14 through ejecting the ball bearing 92 into the roller element recess 96 and the ball bearing 92 becoming lodged between the roller element recess 96 and the roller drill bit body recess 98 to thereby cease rotation of the roller element 14, as shown in FIG. 9C. In another embodiment shown in FIGS. 10A–10C, wherein the roller drill bit body 12 includes a roller drill bit body recess 102 and the roller element 14 includes a roller element recess 104, and the rotation impeder is a wedge 100 selectively fitted in the roller drill bit body recess 102, the step of impeding the rotation of the roller element 14 with the rotation impeder is impeding the rotation of the roller element 14 through ejecting the wedge 100 into the roller element recess 104 and the wedge 100 becoming lodged between the roller element recess 104 and the roller drill bit body 12 to thereby cease rotation of the roller element, as shown in FIG. 10C.

While there has been shown a preferred and alternate embodiments of the present invention, it is to be understood that certain changes may be made in the forms and arrangement of the elements and steps of the method without departing from the underlying spirit and scope of the invention as is set forth in the claims.

What is claimed is:

1. A system for detecting the wear of a roller bit bearing, comprising:
    a roller drill bit body having at least one roller bit bearing;
    a roller element including a plurality of cutting elements, the roller element rotatably attached to the roller drill bit body at the bearing; and
    a rotation impeder, separate from the hearing, in between the roller element and roller drill bit body, the rotation impeder selectively impeding the rotation of the roller element when uneven rotation of the roller element indicates that the roller bit bearing may fail.

2. The system of claim 1, wherein the rotation impeder is housed in the roller drill bit body.

3. The system of claim 1, wherein the rotation impeder is housed in the roller element.

4. The system of claim 1, wherein:
    the roller drill bit body includes a drilling fluid passage and outlet therein; and
    the rotation impeder is positioned in the fluid outlet to prevent drilling fluid from flowing through the passage and out of the outlet, and wherein uneven rotation of the roller element causes the rotation impeder to impede the rotation of the roller element and to be removed from the fluid outlet whereby drilling fluid flows through the drilling fluid passage and out of the fluid outlet.

5. The system of claim 1, wherein:
    the roller element includes a recess that is placed in between the roller element and roller drill bit body; and
    the rotation impeder is selectively extended from the roller drill bit body and into the recess to thereby cease rotation of the roller element.

6. The system of claim 5, wherein the rotation impeder is a selectively extendable detent.

7. The system of claim 5, wherein the rotation impeder is a plug.

8. The system of claim 1, wherein:
    the roller drill bit body includes a roller drill bit body recess therein, the roller drill bit body recess facing the roller element when rotatably attached to the roller bit bearing;
    the roller element includes a roller element recess therein which interfaces the roller drill bit body recess; and
    the rotation impeder is comprised of a ball bearing and a spring in the roller drill bit body, wherein upon uneven rotation of the roller element, the ball bearing is ejected into the roller element recess and the ball bearing becomes lodged between the roller element recess and the roller drill bit body recess to thereby cease rotation of the roller element.

9. The system of claim 1, wherein:
    the roller drill bit body includes a roller drill bit body recess therein, the roller drill bit body recess facing the roller element when rotatably attached to the roller element bearing;
    the roller element includes a roller element recess therein which interfaces the roller drill bit body recess; and
    the rotation impeder is comprised of a wedge selectively fitted in the roller drill bit body, wherein upon uneven rotation of the roller element, the wedge is ejected into the roller element recess and the wedge becomes lodged between the roller element recess and the roller drill bit body to thereby cease rotation of the roller element.

10. A method for detecting the wear of a roller bit bearing of a roller drill bit body having at least one roller bit bearing, a roller element including a plurality of cutting elements and rotatably attached to the roller drill bit body at the bearing, and a rotation impeder, separate from the bearing, that selectively impedes rotation of the roller element and is in between the roller bit and roller drill bit body, the method comprising the steps of:
    rotating the at least one roller element;
    upon uneven rotation of the at least one roller element, impeding the rotation of the at least one roller bit with the rotation impeder; and
    detecting the cessation of the rotation of the at least one roller element.

11. The method of claim 10, wherein:
    the roller drill bit body includes a drilling fluid passage and outlet therein;
    the rotation impeder is positioned in the fluid outlet to prevent drilling fluid from flowing through the fluid passage and out of the outlet; and
    further comprising the steps of:
        upon uneven rotation of the roller element causing the rotation impeder to impede the rotation of the roller element, removing the rotation impeder from the fluid outlet whereby drilling fluid flows through the drilling fluid passage and out of the fluid outlet; and
        detecting a drop in drilling fluid pressure due the flowing of drilling fluid occurring from the removal of the rotation impeder from the fluid outlet.

12. The method of claim 10, wherein:
    the roller element includes a recess that is placed in between the roller element and roller drill bit body; and
    the step of impeding the rotation of the at least one roller element with the rotation impeder is selectively extending the rotation impeder from the roller drill bit body into the recess to thereby cease rotation of the roller element.

13. The method of claim 10, wherein:

the roller drill bit body includes a roller drill bit body recess therein, the roller drill bit body recess facing the roller element when rotatably attached to the roller bit bearing;

the roller element includes a roller element recess therein which interfaces the roller drill bit body recess;

the rotation impeder is comprised of a ball bearing and a spring in the roller drill bit body; and the step of impeding the rotation of the at least one roller element with the rotation impeder is impeding the rotation of the at least one roller element through ejecting the ball bearing into the roller element recess and the ball bearing becoming lodged between the roller element recess and the roller drill bit body recess to thereby cease rotation of the roller element.

14. The method of claim 10, wherein:

the roller drill bit body includes a roller drill bit body recess therein, the roller drill bit body recess facing the roller element when rotatably attached to the roller bit bearing;

the roller element includes a roller element recess therein which interfaces the roller drill bit body recess;

the rotation impeder is comprised of a wedge selectively fitted in the roller drill bit body;

and the step of impeding the rotation of the at least one roller element with the rotation impeder is impeding the rotation of the at least one roller element through ejecting the wedge into the roller element recess and the wedge becoming lodged between the roller element recess and the roller drill bit body to thereby cease rotation of the roller element.

15. A system for detecting the wear of a roller bit bearing, comprising:

a roller drill bit body having at least one roller bit bearing;

a roller element including a plurality of cuffing elements, the roller bit rotatably attached to the roller drill bit body at the bearing; and a rotation impeding means, in between the roller element and roller drill bit body and separate from the bearing for selectively impeding the rotation of the roller element when uneven rotation of the roller element indicates that the roller bit bearing may fail.

16. The system of claim 15, wherein:

the roller drill bit body includes a drilling fluid passage therein; and the rotation impeding means is positioned in the fluid passage to prevent drilling fluid from flowing through the passage, and wherein uneven rotation of the roller element causes the rotation impeding means to impede the rotation of the roller element and causes drilling fluid to flow from the drilling fluid passage.

17. The system of claim 15, wherein: the roller element includes a recess that is placed in between the roller element and roller drill bit body; and the rotation impeding means is selectively extended from the roller drill bit body and into the recess to thereby cease rotation of the roller element.

18. The system of claim 15, wherein:

the roller drill bit body includes a roller drill bit body recess therein, the roller drill bit body recess facing the roller element when rotatably attached to the roller bit bearing;

the roller element includes a roller element recess therein which interfaces the roller drill bit body recess; and the rotation impeding means is comprised of a wedging means in the roller drill bit body, wherein upon uneven rotation of the roller element, the wedging means is ejected into the roller element recess and becomes lodged between the roller element recess and the roller drill bit body recess to thereby cease rotation of the roller element.

\* \* \* \* \*